US008918844B1

(12) United States Patent
Friedman et al.

(10) Patent No.: US 8,918,844 B1
(45) Date of Patent: Dec. 23, 2014

(54) DEVICE PRESENCE VALIDATION

(71) Applicant: EMC Corporation, Hopkinton, MA (US)

(72) Inventors: Lawrence N. Friedman, Arlington, MA (US); Karl Ackerman, Topsfield, MA (US); Kenneth D. Ray, Seattle, WA (US); Yedidya Dotan, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 14 days.

(21) Appl. No.: 13/630,388

(22) Filed: Sep. 28, 2012

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................................ 726/4

(58) Field of Classification Search
CPC ............................................. G06F 2221/2115
USPC ............................................................ 726/4
See application file for complete search history.

(56) References Cited

U.S. PATENT DOCUMENTS

| | | | |
|---|---|---|---|
| 7,522,551 B2 * | 4/2009 | Giaimo et al. | 370/328 |
| 7,548,886 B2 | 6/2009 | Kirkland et al. | |
| 7,756,270 B2 * | 7/2010 | Shimosato et al. | 380/43 |
| 7,839,814 B2 * | 11/2010 | Narasimha et al. | 370/328 |
| 7,912,966 B2 * | 3/2011 | Witkowski et al. | 709/227 |
| 7,916,626 B2 * | 3/2011 | Smith et al. | 370/216 |
| 8,554,912 B1 * | 10/2013 | Reeves et al. | 709/225 |
| 2006/0143717 A1 * | 6/2006 | Ransome et al. | 726/35 |
| 2012/0083286 A1 * | 4/2012 | Kim et al. | 455/456.1 |

* cited by examiner

*Primary Examiner* — Dant Shaifer Harriman
(74) *Attorney, Agent, or Firm* — BainwoodHuang

(57) ABSTRACT

An improved technique involves authenticating a user based on ability of devices in the user's possession to corroborate environmental information between each other. As part of an authentication process, at least a primary device and a secondary device belonging to a user take readings of a particular set of environmental conditions, such as wireless networks that are active in a room in which they are contained. An authentication server can then verify that the primary and secondary devices are in the same room by corroborating the readings of the environmental conditions read from the primary and secondary devices, and base an authentication result on the corroboration.

20 Claims, 4 Drawing Sheets

DEVICE PRESENCE VALIDATION

BACKGROUND

Some online service providers such as banking institutions require some form of authentication in order to process a transaction. For example, a user that wishes to transfer funds from an account with a bank to another account typically needs to provide something he knows, such as a password, to the bank in order to the bank to carry out the transfer.

Some conventional authentication approaches involve asking the user for something he has in addition to something he knows. Along these lines, once the user wishing to transfer the funds inputs a correct password for a bank account, the bank may require the user to input a randomly generated number from a token application on his smartphone. In order for the bank to process the funds transfer, the user must send the randomly generated number to the bank as proof that the user has the smartphone.

SUMMARY

Unfortunately, there are deficiencies with the above-described conventional authentication approaches. For example, requiring a user to input additional information represents an inconvenience to the user.

In contrast to conventional authentication approaches in which there is an inconvenience to the user, an improved technique involves authenticating a user based on ability of devices in the user's possession to corroborate environmental information between each other. As part of an authentication process, at least a primary device and a secondary device belonging to a user take readings of a particular set of environmental conditions, such as wireless networks that are active in a room in which they are contained. An authentication server can then verify that the primary and secondary devices are in the same room by corroborating the readings of the environmental conditions read from the primary and secondary devices, and base an authentication result on the corroboration.

For example, suppose that a user in a café who has a laptop and a mobile phone wishes to log into her existing bank account. Prior to a login, an authentication server associated with the bank has installed software on the laptop and mobile phone that takes readings of wireless networks in the vicinity and send the readings to the authentications server. When the user beings the login process, the authentication server verifies that the wireless networks that the laptop and the mobile phone see match.

Advantageously, the improved technique allows for secure authentication without requiring the user to take any action at all. Because devices such as smartphones and computers include circuitry to sense their environment (e.g., wireless antennae, microphones, etc.), such devices can automatically send readings of that environment to an authentication server without any input from the user.

One embodiment of the improved technique is directed to a method of authenticating a user requesting access to resources. The method includes obtaining, from a first device, i) a first dataset containing values of a set of environmental factors as observed from the first device, and ii) a second dataset containing values of the set of environmental factors as observed from a second device, the set of environmental factors representing environmental conditions and activities taking place within a vicinity of the first device and the second device. The method also includes receiving a request to access the resources and, in response to the request, performing a comparison operation on the first dataset and the second dataset, the comparison operation producing a comparison result that is indicative of whether the first dataset and the second dataset are sufficiently matched. The method further includes granting the user access to the resources when the comparison result is indicative of the first dataset and the second dataset being sufficiently matched, and not granting the user access to the resources when the comparison result is not indicative of the first dataset and the second dataset being sufficiently matched.

Additionally, some embodiments of the improved technique are directed to a system constructed and arranged to authenticate a user requesting access to resources. The system includes a network interface, memory, and a controller including controlling circuitry constructed and arranged to carry out the method of authenticating a user requesting access to resources.

Furthermore, some embodiments of the improved technique are directed to a computer program product having a non-transitory computer readable storage medium which stores code including a set of instructions to carry the method of authenticating a user requesting access to resources.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves authenticating a user based on ability of devices in the user's possession to corroborate environmental information between each other. As part of an authentication process, at least a primary device and a secondary device belonging to a user take readings of a particular set of environmental conditions, such as wireless networks that are active in a room in which they are contained. An authentication server can then verify that the primary and secondary devices are in the same room by corroborating the readings of the environmental conditions read from the primary and secondary devices, and base an authentication result on the corroboration.

Advantageously, the improved technique allows for secure authentication without requiring the user to take any action at all. Because devices such as smartphones and computers include circuitry to sense their environment (e.g., wireless antennae, microphones, etc.), such devices can automatically send readings of that environment to an authentication server without any input from the user.

Figure 1:
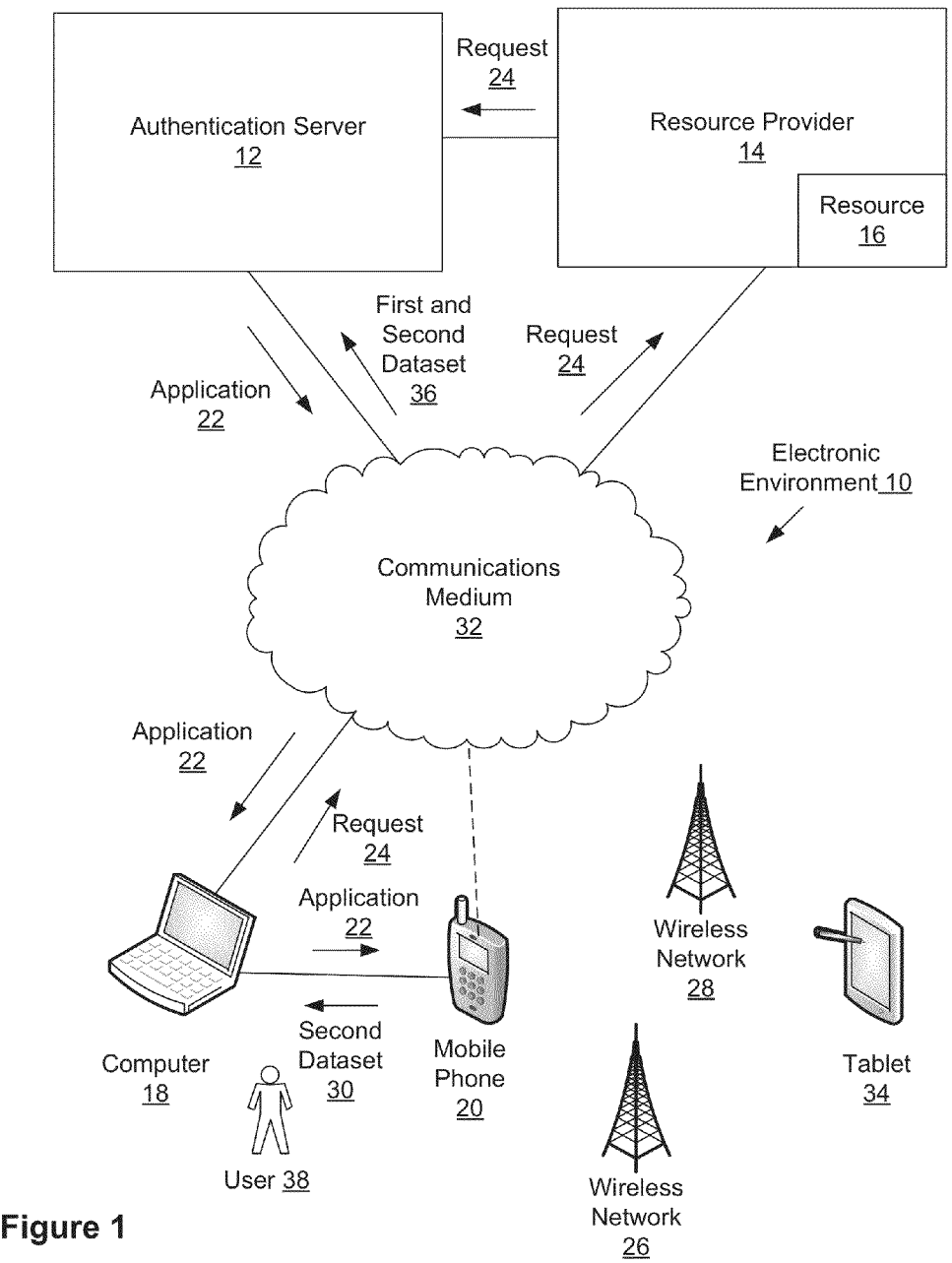
FIG. 1 is a block diagram illustrating an example electronic environment for carrying out the improved technique.

FIG. 1 illustrates an example electronic environment 10 for carrying out the improved technique. Electronic environment 10 includes an authentication server 12, a resource provider 14, a computer 18, a mobile phone 20, wireless networks 26 and 28, tablet 34, and communications medium 32.

Communication medium 32 provides network connections between authentication server 12, resource provider 14, and computer 18. In some arrangements, communications medium 32 also provides network connections between authentication server 12 and mobile phone 20. Communications medium 32 may implement a variety of protocols such as TCP/IP, UDP, ATM, Ethernet, Fibre Channel, combinations thereof, and the like. Furthermore, communications media 32 may include various components (e.g., cables, switches/routers, gateways/bridges, NAS/SAN appliances/nodes, interfaces, etc.). Moreover, the communications medium 32 are capable of having a variety of topologies (e.g., queue manager-and-spoke, ring, backbone, multi drop, point to-point, irregular, combinations thereof, and so on).

Authentication server 12 provides verification of authenticity of user 38 on behalf of resource provider 14 by comparing values of environmental conditions obtained from computer 18 and mobile phone 20. Further details of authentication server 12 will be described below with respect to FIG. 2.

Resource provider 14 includes a server (not pictured) that hosts a web site from which user 38 may access resource 16. For example, if resource provider 14 represents a banking institution, resource 16 may be a bank account through which user 38 accesses money.

Computer 18 provides user 38 access to resource provider 14 via communications medium 32. Computer 18 is a laptop as illustrated in FIG. 1; in some arrangements, however, computer 18 takes the form of a desktop, a tablet, a smartphone, a personal digital assistant, or a netbook.

Mobile phone 20 is able to be detected by computer 18. In some arrangements, mobile phone 18 may be a tablet, a netbook, a personal digital assistant, or any portable device that can be detected by computer 18 via Bluetooth®, universal serial bus (USB), RF, Line of Site®, Airdrop®, Bonjour®, wireless IEEE 802.11(a, b, g, n), or another connection.

Wireless networks 26 and 28 include IEEE 802.11-type signals (e.g., 802.11a, b, g, n), and are signals detected by computer 18 and mobile phone 20.

Tablet 34 is a portable device not in possession of user 38.

During operation, authentication server 12 sends computer 18 an application 22 over communications medium 32. Application 22 is configured to collect values of environmental conditions in the vicinity of a device on which it runs, and send the values in a dataset to authentication server 12. In some arrangements, application 22 encrypts the dataset before sending the dataset to authentication server 12. Application 22 is further configured to run on computer 18 and mobile phone 20. Once application 22 is installed on computer 18, computer 18 installs application 22 on mobile phone 20.

It should be understood that the environmental conditions to be detected by computer 18 and mobile phone 20 are, in some arrangements, dictated by authentication server 12. For example, along with application 20, authentication server 12 sends computer 18 a message to application 20 indicating which environmental conditions computer 18 and mobile phone 20 are to detect and/or measure. In some arrangements, authentication server 12 may instruct application 20 to measure local temperature variation (assuming computer 18 and mobile phone 20 are outfitted with devices that measure temperature).

Computer 18 detects wireless networks 26 and 28 in the vicinity of computer 18. The detection of wireless networks 26 and 28 occurs when computer 18 is set to automatically detect wireless networks such as WiFi networks. Wireless networks 26 and 28 include identifiers that computer 18 uses for identification. Wireless networks 26 and 28 also include a measure of signal strength. In some arrangements, the signal strength is measured in "bars"; in other arrangements, the signal strength is measured with a number between 0 and 10.

At the same time, mobile phone 20 detects wireless networks 26 and 28. Mobile phone 20, using application 20, packages the identifiers of wireless networks 26 and 28 as well as corresponding signal strengths within a second dataset 30. Mobile phone 20 then sends second dataset 30 to computer 18 over the connection between computer 18 and mobile phone 20.

It should be understood that, by packaging the identifiers in second dataset 30, application 20 includes a timestamp representing when wireless networks 26 and 28 were measured. Such a timestamp is needed so that the comparison of values of environmental conditions is such that any difference between values cannot be ascribed to a time difference. For example, while wireless networks 26 and 28 may fluctuate in strength and even presence over time, comparisons made at a reasonably similar time should result in the same wireless network identifiers being included in first dataset and second dataset 30.

Figure 2:
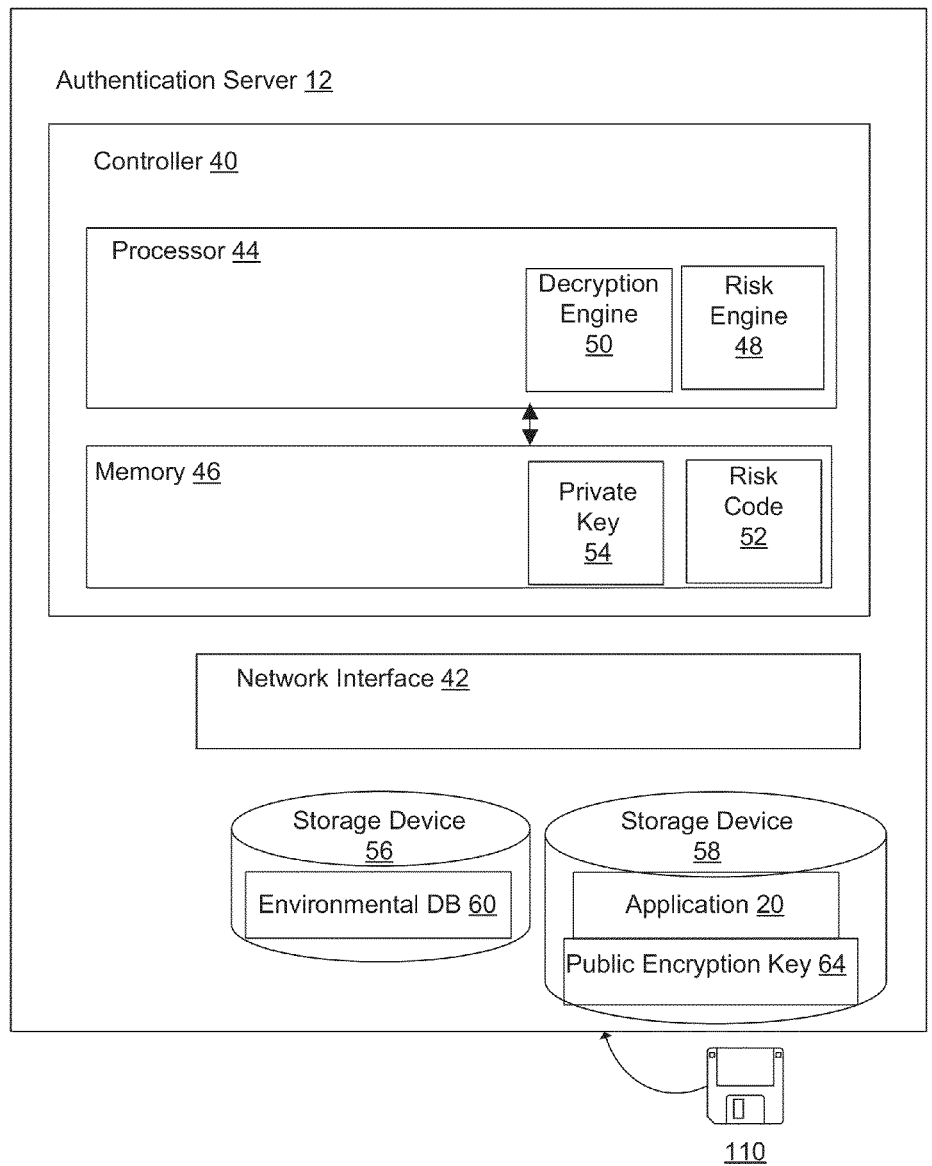
FIG. 2 is a block diagram illustrating an example authentication server within the electronic environment shown in FIG. 1.

In some arrangements, mobile phone 20 encrypts second dataset 30 using application 20 with a public encryption key 64 (see FIG. 2). Public encryption key 64 is part of an asymmetric public key cryptographic scheme, created with a corresponding private key 54 (see FIG. 2) that is stored on authentication server 12. By encrypting second dataset 30, mobile phone 20 helps to improve the security of the improved technique, as a potential imposter would have no way of reading the identifiers of wireless networks 26 and 28 unless that imposter possessed the private key 54.

Computer 18 receives second dataset 30. At roughly the same time, computer 18, using application 20, packages the identifiers of wireless networks 26 and 28 as well as corresponding signal strengths and a timestamp within a first dataset (not pictured separately). In some arrangements, computer 18 encrypts the first dataset using application 20 with public encryption key 84.

Computer 18 then sends a message 36 including first and second datasets to authentication server via communications medium 32. Upon receipt, authentication server stores first and second datasets within environmental database 60 on storage device 56 (see FIG. 2).

Sometime later, user 38 sends, via computer 18, a request 24 to resource provider 14 via communications medium 32 to access resource 16. For example, user 38 wishes to access an account at an online bank using a web browser running on computer 18. Request 24 includes information identifying the owner of the account, e.g., user identifier, password, biometric, etc.

Upon receiving request 24, resource provider 14 sends information from request 24 to authentication server 12. Authentication server 12 then performs a lookup operation on environmental database 60 to locate the information identifying the owner of the account.

Once authentication server 12 locates information identifying the owner of the account, authentication server 12 analyzes the difference between first and second datasets for similar timestamps. If first and second datasets 36 are encrypted, authentication server 12 first decrypts first and second datasets 36 using private key 54 (see FIG. 2).

Authentication server 12 then performs a comparison operation on values of the environmental conditions within first and second datasets 36 for similar timestamps. For example, authentication server 12 compares the identifiers of wireless networks within first and second datasets 36; if a particular number of the wireless networks in each dataset are the same, then authentication server 12 may conclude that computer 18 and mobile phone 20 are in the vicinity of each other, and therefore user 38 has the mobile phone 20. On the other hand, if the number of the wireless networks in second dataset 30 differs from the particular number, then authentication server 12 may require more information from user 38. In some arrangements, authentication server 12 determines the particular number by considering the signal strengths associated with the wireless network identifiers: a wireless network is used in the comparison operation is its signal strength is greater than a threshold signal strength.

It should be understood that similarity in time is measured by an absolute value between two timestamps. If such an absolute value is smaller than a threshold time difference, then the times are said to be similar.

It should be understood that mobile phone 20 may, in some arrangements, send second dataset 30 to authentication server 12 directly via communications medium 32. Such an arrangement allows authentication server 12 to verify the values of environmental conditions independently of computer 18.

In some arrangements, computer 18 and/or mobile phone 20 detects the presence of another device such as tablet 34 which does not run application 20. Such a presence may be expressed within first and/or second dataset 36. For example, when tablet 34 and mobile phone 20 are connected to wireless network 28, mobile phone 20 can detect an identifier of tablet 34 (e.g., a MAC address). Application 20 may then send such an identifier to authentication server 12 via second dataset 30. Upon receipt of message 36 containing second dataset 30, authentication server 12 compares the identifier of tablet 34 against a list of identifiers for which alerts have been issued (i.e., tablet 34 is associated with a known troublemaker). If the identifier of tablet 34 is on such a list, then authentication server does not allow the requested transaction to take place. In some further arrangements in which privacy is expected, authentication server 12 need not check such an identifier against a list; the mere presence of tablet 34 would be enough to cancel the transaction.

Further details of authentication server 12 are provided below with respect to FIG. 2.

FIG. 2 illustrates authentication server 12. Authentication server 12 includes controller 40, which in turn includes processor 44 and memory 46, network interface 42, and storage devices 56 and 58.

Network interface 42 takes the form of an Ethernet card; in some arrangements, network interface 42 takes other forms including a wireless receiver and a token ring card.

Memory 46 generally takes the form of, e.g., random access memory, flash memory or a non-volatile memory. Memory 46 is configured to store code which includes risk code 52 configured to generate a risk score based on various factors which may include, along with a most recent difference between two datasets, historical differences as stored in environmental database 60 as well as a presence of specific devices such as tablet 34. Memory 46 also includes space for private key 54 which is used to decrypt datasets encrypted with corresponding public encryption key 64 (see FIG. 3).

Processor 44 takes the form of, but is not limited to, Intel or AMD-based MPUs, and can include a single or multi-cores each running single or multiple threads. Processor 44 is coupled to memory 46 and is configured to execute instructions from risk code 52. Processor 44 includes risk engine 48 and decryption engine 50.

Storage device 56 is configured to store environmental database 60, which in turn stores values of environmental conditions collected by application 20 over time. Storage device 58 contains code for application 20, as well a public encryption key 64, both of which are sent to computer 18 by processor 44.

During operation, processor 44 sends application 20 and public encryption key 64, via network interface 42, to computer 18 (see FIG. 1). In turn, processor 44 receives, via network interface 42, messages 36 containing first and second datasets (see FIG. 1). When either of the datasets is encrypted with public encryption key 64, decryption engine 50 decrypts that dataset using private key 54. Processor 44 then stores decrypted datasets in environmental database 60.

It should be understood that datasets also include identifiers of the devices from which the datasets were generated. In this way, processor 44 registers such devices in database 60.

Sometime later, processor 44 receives request 24 (see FIG. 1) from user 38 which includes an identifier of an owner of an account with resource provider 14 (see FIG. 1). Processor 44 performs a lookup operation on environmental database 60 to find values of environmental conditions associated with that identifier, as well as timestamps corresponding to the values. Processor 44 determines pairs of environmental conditions with similar times as described above. In the case of datasets coming from computer 18 and mobile phone 20 over a long period of time (i.e., much history in database 60), risk engine 48 considers datasets having the same values of environmental conditions over such history as having a very low risk score (i.e., low risk). On the other hand, for a most recent pair of datasets not matching, or datasets involving many different devices over a relatively short history, risk engine 48 provides a higher risk score.

Risk engine 48 also takes into account the presence of other devices such as tablet 34 that are not registered in database 60. Risk engine 48 increases the risk score of a transaction when there is a presence of such an unregistered device, in some cases, to a point where the request to process the transaction is not allowed.

Further detail of computer 18 is provided below with respect to FIG. 3.

Figure 3:
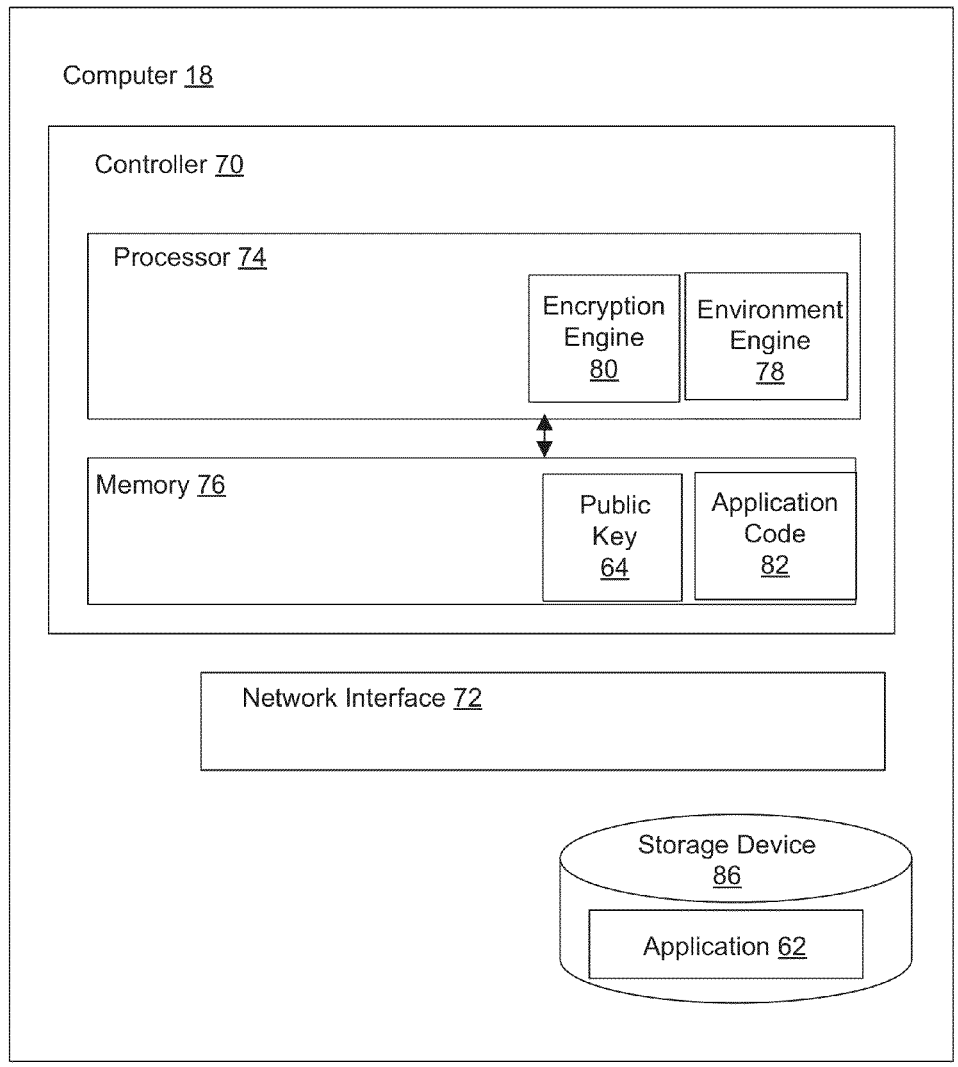
FIG. 3 is a block diagram illustrating an example user computer within the electronic environment shown in FIG. 1

FIG. 3 illustrates computer 18. Computer 18 includes controller 70, which in turn includes processor 74 and memory 76, network interface 72, and storage device 86 which stores application 62.

Network interface 72 takes the form of an Ethernet card; in some arrangements, network interface 72 takes other forms including a wireless receiver and a token ring card.

Memory 76 generally takes the form of, e.g., random access memory, flash memory or a non-volatile memory. Memory 76 is configured to store code which includes application code 82 configured to detect values of environment conditions provided by application 20. Memory 50 also includes space for public key 64 which is used to encrypt datasets.

Processor 74 takes the form of, but is not limited to, Intel or AMD-based MPUs, and can include a single or multi-cores each running single or multiple threads. Processor 74 is coupled to memory 76 and is configured to execute instructions from application code 82. Processor 44 includes environment engine 78 and encryption engine 80.

It should be understood that environment engine 78 may take the form of a module that includes sensors to detect various environmental conditions. For example, environment engine 78 may include an antenna configured to detect 802.11n wireless signals.

During operation, processor 74 receives application 20, which includes a set of environmental conditions to be measured (e.g., wireless networks active in the vicinity). User 38 then sends application 20 to devices such as mobile phone 20 (see FIG. 1) that will be used for authentication.

At predetermined time intervals, environment engine 78 takes measurements of the environmental conditions in the vicinity of computer 18 and forms the measurements into values formatted for inclusion in a dataset. For example, environment engine 78 detects wireless signals and stores the identifiers of those signals, as well as their corresponding signal strengths, in a linked list in memory 76.

In some arrangements, encryption engine 80 encrypts the data using public encryption key 64. Such an encryption scheme may be any used in asymmetric public key encryption, e.g., SHA-1 or the like.

Processor 74 then receives, over network interface 72, another dataset 30 containing values of the environmental conditions as measured from the device to which processor 74 sent application 20. Processor 74 packages both datasets into a message 36 (see FIG. 1) and sends the message to authentication server 12 (see FIG. 1) using network interface 72.

Figure 4:
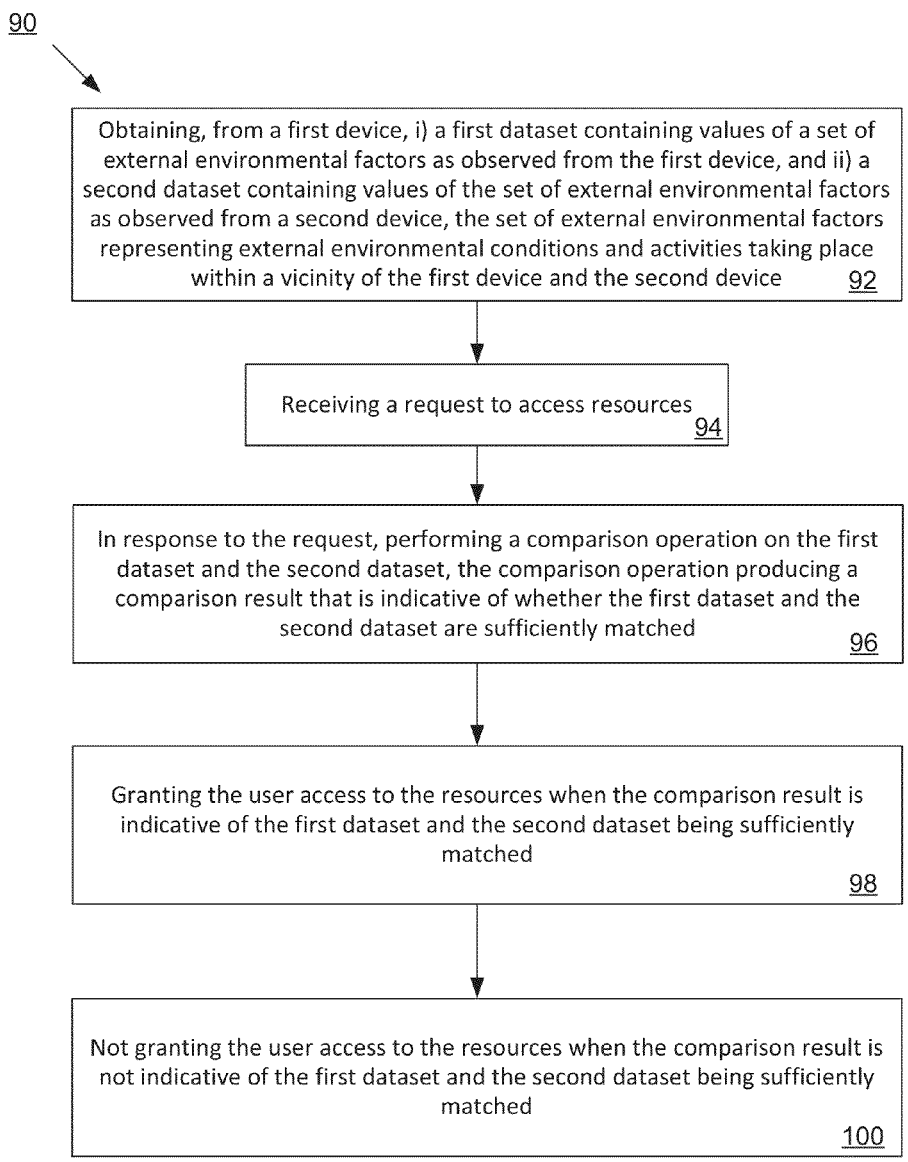
FIG. 4 is a flow chart illustrating a method of carrying out the improved technique within the electronic environment shown in FIG. 1.

FIG. 4 illustrates a method 90 of authenticating a user requesting access to resources. In step 92, a first dataset containing values of a set of environmental factors as observed from the first device, and a second dataset containing values of the set of environmental factors as observed from a second device are obtained from a first device, the set of environmental factors representing environmental conditions and activities taking place within a vicinity of the first device and the second device. In step 94, a request to access the resources is received. In step 96, a comparison operation on the first dataset and the second dataset is performed in response to the request, the comparison operation producing a comparison result that is indicative of whether the first dataset and the second dataset are sufficiently matched. In step 98, the user is granted access to the resources when the comparison result is indicative of the first dataset and the second dataset being sufficiently matched. In step 100, the user is not granted access to the resources when the comparison result is not indicative of the first dataset and the second dataset being sufficiently matched.

While various embodiments of the invention have been particularly shown and described, it will be understood by those skilled in the art that various changes in form and details may be made therein without departing from the spirit and scope of the invention as defined by the appended claims.

For example, datasets encrypted on various registered devices may also include digital signatures of those devices. In such a case, the digital signatures take the form of signed tokens that attest to the identities of the devices. The existence of such digital signatures in encrypted datasets lowers the risk score computed by risk engine 48.

Further, while asymmetric public key encryption was described above with respect to encrypting datasets, it should be understood that other encryption schemes such as symmetric key encryption may be used as well.

Further, it should be understood that computer 18 and mobile phone 20 are particular examples of devices that user 38 may use in communicating with authentication server 12. User 38 may use any combination of devices, mobile or otherwise, for such communication. Moreover, such interdevice communications may take place over wireless communications, as described above, or over a wired network, such as Ethernet, token ring, or the like.

Furthermore, it should be understood that some embodiments are directed to authentication server 12, which is constructed and arranged to authenticate a user requesting access to resources. Some embodiments are directed to a process of authenticating a user requesting access to resources. Also, some embodiments are directed to a computer program product which enables computer logic to authenticate a user requesting access to resources.

In some arrangements, authentication server 12 is implemented by a set of processors or other types of control/processing circuitry running software. In such arrangements, the software instructions can be delivered, within authentication server 12, respectively (see FIG. 2), in the form of a computer program product 110, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of authenticating a user requesting access to resources, the method comprising:

obtaining, by a server and from a first device, i) a first dataset containing values of a set of external environmental factors as observed from the first device, and ii) a second dataset containing values of the set of external environmental factors as observed from a second device, the set of external environmental factors representing external environmental conditions and activities taking place within a vicinity of the first device and the second device;

receiving, by the server, a request to access the resources;

in response to the request, performing, by the server, a comparison operation on the first dataset and the second dataset, the comparison operation producing a comparison result that is indicative of whether the first dataset and the second dataset are matched to within a predetermined tolerance;

granting, by the server, the user access to the resources when the comparison result is indicative of the first dataset and the second dataset being matched to within the predetermined tolerance; and not granting the user access to the resources when the comparison result is not indicative of the first dataset and the second dataset being matched to within the predetermined tolerance;

wherein the method further comprises, prior to obtaining the first dataset and the second dataset from the first device, sending an application to the first device, the application containing code including instructions which, when executed by a processor of the first device, cause the first device to i) receive the values of the set of external environmental factors as observed by the first device, and ii) receive the values of the external environmental factors as observed by the second device from the second device, wherein the comparison operation is performed by the server on the values of the environmental factors as observed by the first device and the values of the environmental factors as observed by the second device.

2. A method as in claim 1, wherein the first dataset further includes a first timestamp and the second dataset further includes a second timestamp;

wherein performing the comparison operation includes:

producing a time difference which is an absolute value of a difference between the first timestamp and the second timestamp, the comparison result not being indicative of the first dataset and the second dataset being matched to within the predetermined tolerance when the time difference is greater than a threshold time difference.

3. A method as in claim 2, further comprising:
prior to receiving the first dataset and the second dataset, sending an application to the first device and the second device, the application being configured to i) receive the set of external environmental conditions, the comparison operation being performed on the values of the external environmental conditions, and ii) send values of the external environmental conditions within datasets over the network.

4. A method as in claim 3,
wherein the application is further configured to digitally sign datasets with an encryption code to form at least one encrypted dataset;
wherein the method further comprises:
prior to performing the comparison operation, decrypting the least one of the first dataset and the second dataset with a decryption code corresponding to the encryption code.

5. A method as in claim 2,
wherein the set of external environmental factors includes a set of wireless network identifiers, each wireless network identifier of the set of wireless network identifiers identifying a wireless network in the vicinity of the user;
wherein performing the comparison operation further includes:
verifying that a particular number of wireless network identifiers of the set of wireless network identifiers of the first dataset and that particular number of wireless network identifiers of the set of wireless network identifiers of the second dataset are the same.

6. A method as in claim 5,
wherein the set of external environmental factors further includes a set of signal strengths, each signal strength of the set of signal strengths corresponding to a wireless network identifier of the set of wireless network identifiers;
wherein verifying that the particular number of wireless network identifiers of the set of wireless network identifiers in both the first dataset and the second dataset are the same includes:
producing, as the particular number, a number of wireless network identifiers of the first dataset to which a signal strength of the set of signal strengths having a value greater than a threshold signal strength corresponds.

7. A method as in claim 2,
wherein receiving the first dataset and the second dataset includes:
obtaining the first dataset and the second dataset over a first communication channel;
wherein the method further comprises:
receiving the second dataset over a second communications channel that is distinct from the first communications channel.

8. A method as in claim 2,
wherein the method further comprises:
receiving, from the first device, a signal indicating that a third device is in the vicinity of the first device;
performing a lookup operation on a database, the lookup operation producing a lookup result that is indicative of whether the third device has an alert status; and
not granting the user access to the resources when the third device has the alert status.

9. A method of authenticating a user requesting access to resources, the method comprising:
receiving, at a first device, a message from an authentication server, the message including a set of external environmental conditions, the set of external environmental factors representing external environmental conditions and activities taking place within a vicinity of the first device and a second device;
providing, by the first device, the message to a second device;
generating, by the first device, first values of the set of external environmental conditions;
obtaining second values of the set of external environmental conditions from the second device; and
sending a first dataset that includes the first values of the set of external environmental conditions and a second dataset that includes the second values of the set of external environmental conditions to the authentication server, the authentication server performing a comparison operation on the first values and the second values in order to verify an authenticity of the user;
wherein the method further comprises, prior to receiving the message from the authentication server, receiving an application from the authentication server, the application containing code including instructions which, when executed by a processor of the first device, cause the first device to i) receive the values of the set of external environmental factors as observed by the first device, and ii) receive the values of the external environmental factors as observed by the second device from the second device, wherein the comparison operation is performed by the server on the values of the environmental factors as observed by the first device and the values of the environmental factors as observed by the second device.

10. A method as in claim 9,
wherein the message further includes an encryption code that corresponds to a decryption code stored on the authentication server;
wherein the method further comprises:
encrypting the first dataset with the encryption code to produce an encrypted dataset;
wherein the authentication server is configured to decrypt the encrypted dataset to retrieve the first dataset.

11. A system configured to authenticate a user requesting access to resources, the system comprising:
a network interface;
memory; and
a controller including controlling circuitry coupled to the memory, the controlling circuitry being constructed and arranged to:
obtain, from a first device, i) a first dataset containing values of a set of external environmental factors as observed from the first device, and ii) a second dataset containing values of the set of external environmental factors as observed from a second device, the set of external environmental factors representing external environmental conditions and activities taking place within a vicinity of the first device and the second device;
receive a request to access the resources;
in response to the request, perform a comparison operation on the first dataset and the second dataset, the comparison operation producing a comparison result that is indicative of whether the first dataset and the second dataset are matched to within a predetermined tolerance;
grant the user access to the resources when the comparison result is indicative of the first dataset and the second dataset being matched to within the predetermined tolerance; and not grant the user access to the resources when the comparison result is not indicative of the first dataset and the second dataset being matched to within the predetermined tolerance;

wherein the controlling circuitry is further constructed and arranged to, prior to obtaining the first dataset and the second dataset from the first device, send an application to the first device, the application containing code including instructions which, when executed by a processor of the first device, cause the first device to i) receive the values of the set of external environmental factors as observed by the first device, and ii) receive the values of the external environmental factors as observed by the second device from the second device, wherein the comparison operation is performed by the server on the values of the environmental factors as observed by the first device and the values of the environmental factors as observed by the second device.

12. A system as in claim 11,
wherein the first dataset further includes a first timestamp and the second dataset further includes a second timestamp;
wherein performing the comparison operation includes:
producing a time difference which is an absolute value of a difference between the first timestamp and the second timestamp, the comparison result not being indicative of the first dataset and the second dataset being matched to within the predetermined tolerance when the time difference is greater than a threshold time difference.

13. A system as in claim 12,
wherein the controlling circuitry is further constructed and arranged to:
prior to receiving the first dataset and the second dataset, sending an application to the first device and the second device, the application being configured to i) receive the set of external environmental conditions, the comparison operation being performed on the values of the external environmental conditions, and ii) send values of the external environmental conditions within datasets over the network.

14. A system as in claim 12,
wherein the set of external environmental factors includes a set of wireless network identifiers, each wireless network identifier of the set of wireless network identifiers identifying a wireless network in the vicinity of the user;
wherein performing the comparison operation further includes:
verifying that a particular number of wireless network identifiers of the set of wireless network identifiers of the first dataset and that particular number of wireless network identifiers of the set of wireless network identifiers of the second dataset are the same.

15. A system as in claim 12,
wherein the controlling circuitry is further constructed and arranged to:
receive, from the first device, a signal indicating that a third device is in the vicinity of the first device;
perform a lookup operation on a database, the lookup operation producing a lookup result that is indicative of whether the third device has an alert status; and
not grant the user access to the resources when the third device has the alert status.

16. A computer program product having a non-transitory, computer-readable storage medium which stores code to authenticate a user requesting access to resources, the code including instructions to:

obtain, from a first device, i) a first dataset containing values of a set of external environmental factors as observed from the first device, and ii) a second dataset containing values of the set of external environmental factors as observed from a second device, the set of external environmental factors representing external environmental conditions and activities taking place within a vicinity of the first device and the second device;

receive a request to access the resources;

in response to the request, perform a comparison operation on the first dataset and the second dataset, the comparison operation producing a comparison result that is indicative of whether the first dataset and the second dataset are matched to within a predetermined tolerance;

grant the user access to the resources when the comparison result is indicative of the first dataset and the second dataset being matched to within the predetermined tolerance; and not grant the user access to the resources when the comparison result is not indicative of the first dataset and the second dataset being matched to within the predetermined tolerance;

wherein the code includes further instructions to, prior to obtaining the first dataset and the second dataset from the first device, send an application to the first device, the application containing code including instructions which, when executed by a processor of the first device, cause the first device to i) receive the values of the set of external environmental factors as observed by the first device, and ii) receive the values of the external environmental factors as observed by the second device from the second device, wherein the comparison operation is performed by the server on the values of the environmental factors as observed by the first device and the values of the environmental factors as observed by the second device.

17. A computer program product as in claim 16,
wherein the first dataset further includes a first timestamp and the second dataset further includes a second timestamp;
wherein performing the comparison operation includes:
producing a time difference which is an absolute value of a difference between the first timestamp and the second timestamp, the comparison result not being indicative of the first dataset and the second dataset being matched to within the predetermined tolerance when the time difference is greater than a threshold time difference.

18. A computer program product as in claim 17,
wherein the code includes further instructions to:
prior to receiving the first dataset and the second dataset, sending an application to the first device and the second device, the application being configured to i) receive the set of external environmental conditions, the comparison operation being performed on the values of the external environmental conditions, and ii) send values of the external environmental conditions within datasets over the network.

19. A computer program product as in claim 17,
wherein the set of external environmental factors includes a set of wireless network identifiers, each wireless network identifier of the set of wireless network identifiers identifying a wireless network in the vicinity of the user;
wherein performing the comparison operation further includes:

verifying that a particular number of wireless network identifiers of the set of wireless network identifiers of the first dataset and that particular number of wireless network identifiers of the set of wireless network identifiers of the second dataset are the same.

20. A computer program product as in claim 17, wherein the code includes further instructions to:

receive, from the first device, a signal indicating that a third device is in the vicinity of the first device;

perform a lookup operation on a database, the lookup operation producing a lookup result that is indicative of whether the third device has an alert status; and not grant the user access to the resources when the third device has the alert status.

\* \* \* \* \*